United States Patent [19]
Miller

[11] Patent Number: 5,235,191
[45] Date of Patent: Aug. 10, 1993

[54] REAL-TIME X-RAY DEVICE

[76] Inventor: Robert N. Miller, 14405 S. Kelmsley, Oregon City, Oreg. 97045

[21] Appl. No.: 847,371

[22] Filed: Mar. 6, 1992

[51] Int. Cl.$^5$ .................... G01T 1/202; H01J 31/50
[52] U.S. Cl. ........................ 250/486.1; 250/483.1; 250/370.09; 250/370.11; 250/368; 378/62; 358/111
[58] Field of Search ........... 250/483.1, 370.09, 370.11, 250/368, 486.1; 378/99, 62, 180, 191; 358/111

[56] References Cited

U.S. PATENT DOCUMENTS

| | | | |
|---|---|---|---|
| 4,096,381 | 6/1978 | Brown, Sr. | 250/213 VT |
| 4,101,781 | 7/1978 | Neukermans et al. | 250/483.1 |
| 4,415,810 | 11/1983 | Brown, Sr. | 250/484.1 |
| 4,445,225 | 4/1984 | White | 378/44 |
| 4,654,558 | 3/1987 | Obata et al. | 313/372 |
| 4,739,172 | 4/1988 | Obata et al. | 250/487.11 |
| 4,755,681 | 7/1988 | Oka et al. | 250/370.01 |
| 4,798,958 | 1/1989 | Janesick et al. | 250/370.01 |
| 4,829,548 | 5/1989 | Halm et al. | 378/38 |
| 4,852,137 | 7/1989 | Mackay | 250/370.09 |
| 4,870,279 | 9/1989 | Cueman et al. | 250/368 |
| 4,904,049 | 2/1990 | Hegg . | |
| 4,910,405 | 3/1990 | Suzuki et al. | 250/368 |
| 4,922,092 | 5/1990 | Rushbrooke et al. | 250/213 VT |
| 4,948,978 | 8/1990 | Guyot | 250/370.11 |
| 4,963,906 | 10/1990 | Goodman | 354/219 |
| 4,979,201 | 12/1990 | Kruger | 378/185 |
| 4,995,068 | 2/1991 | Chou et al. | 378/189 |
| 5,006,709 | 4/1991 | Schiteenhelm | 250/327.2 |
| 5,041,727 | 8/1991 | Kojima et al. | 250/352 |
| 5,065,023 | 11/1991 | Lindmayer | 250/330 |
| 5,108,959 | 4/1992 | Buchanan et al. | 250/483.1 |
| 5,127,032 | 6/1992 | Lam et al. | 378/190 |

Primary Examiner—Carolyn E. Fields
Assistant Examiner—Drew A. Dunn
Attorney, Agent, or Firm—Kolisch, Hartwell, Dickinson, McCormack & Heuser

[57] ABSTRACT

An x-ray imaging system includes an x-ray source for providing x-ray photons which are directed towards a subject and impinge on a scintillating screen. The scintillating screen converts the x-ray photons into a visible light image. The screen is formed of discrete, elongate fiber optic elements arranged side-by-side, having a mirrored surface at one end thereof. The elements are formed of a mixture of glass and rate earth elements which convert the x-ray photons into visible light by first phosphoring and then lasing. The system includes a camera system for capturing the visible light image for remote viewing. A method of constructing the scintillating screen of the invention is disclosed.

15 Claims, 2 Drawing Sheets

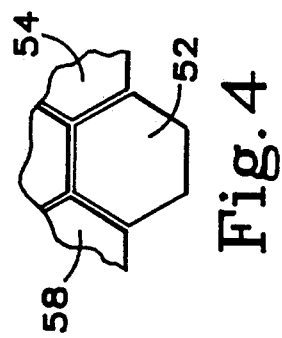
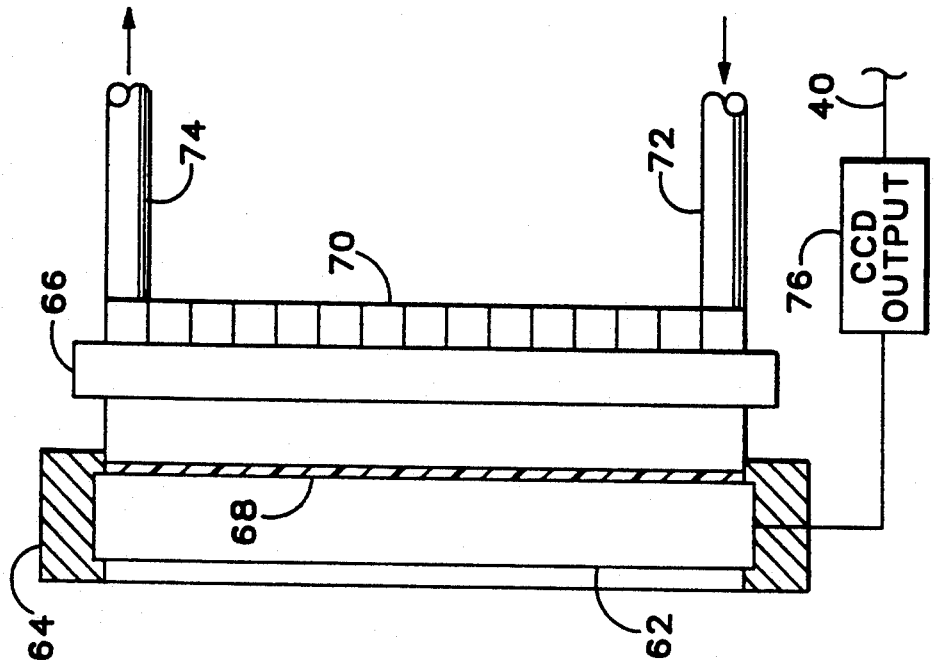
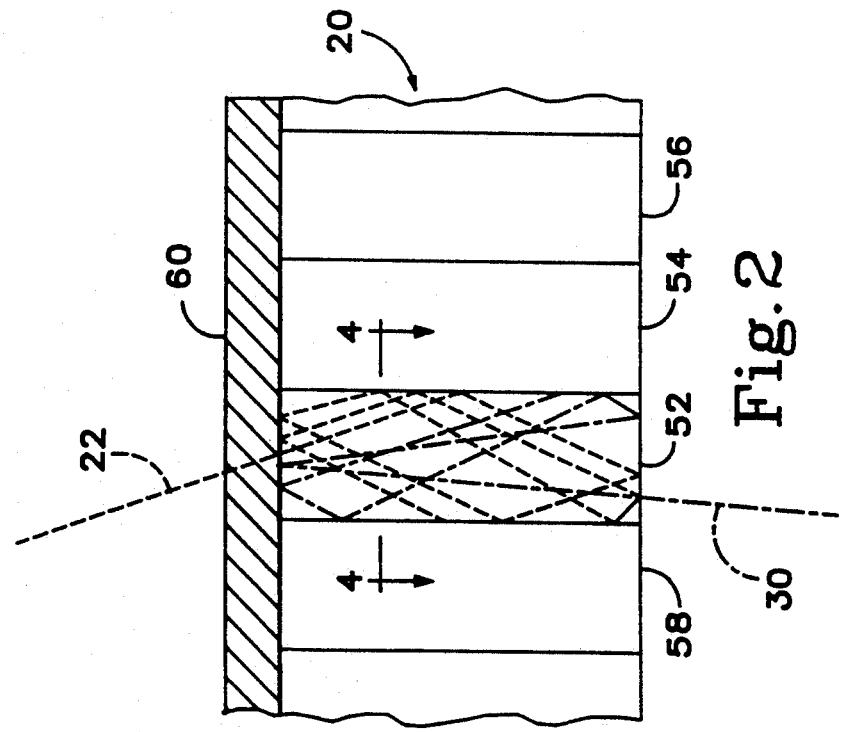

REAL-TIME X-RAY DEVICE

BACKGROUND OF THE INVENTION

The invention relates to x-ray systems, and specifically to a real-time x-ray imaging system having a superior scintillating screen for converting x-ray photons into visible light.

Generally, x-ray imaging is accomplished by passing x-rays emitted from a standard x-ray generated through a component or body part that is to be investigated. The amount of power that is required by the x-ray generator to generate sufficient x-ray photons to penetrate or sufficiently illuminate the subject depends on the thickness and/or density of the subject. The image is generally captured on x-ray film, which is exposed by visible light, which is emitted from a device known as a scintillating screen. In many instances it is desirable to observe the x-ray pattern in real-time, as in the case of a quality control program for industrial use, or for medical purposes, such as in the case of invasive surgery.

In order to generate a real-time image, the x-rays are directed through the subject to a scintillating screen, which is viewed by a video camera. Regardless of whether the image is captured on film or by a video camera, a basic limitation of known x-ray systems is the scintillating screen, which typically converts only about 35-40 percent of the x-ray photons striking the screen into visible light which may be captured by film or video equipment.

Known scintillating screens generally use a plasticized material that is coated with yet another material that phosphors, or glows, producing photons and visible light when impacted by x-ray photon radiation. The capacity of such screens to emit visible light depends on the amount of radiation that impacts the screen after passing through the subject. In the case where the subject is captured on film, the film generally has a narrow latitude, which requires that large or particularly dense subjects be exposed to higher levels of radiation, or for longer periods of time, or both, in order to produce a usable, visible-light radiation from the screen. In the case where industrial, non-electronic, objects are the subject, this is generally not a problem. However, in the case where animal tissue, and particularly human tissue is the subject, it is both desirable and medically required that the amount of x-ray radiation which penetrates the body be limited. However, too little exposure will result in an underexposure of the x-ray film, which will be useless as a medical diagnosis tool. One way to resolve this problem is to make repeated exposures of different view in an attempt to depict the subject adequately on x-ray film. This can, unfortunately, result in damage to the tissue as the result of excessive x-ray exposure. Industrial objects which contain electronic components may be damaged by long exposure to x-ray photons, and therefore require that low levels of radiation be used with relatively short exposures.

A variety of mechanisms and techniques have been developed in order to limit the amount of x-ray radiation that a subject may be exposed to in order to produce a usable image. One technique is to provide x-ray films having various contrast levels in order to achieve the desired image on film, even if a number of sheets of film are required to adequately depict the subject.

Another variation is the provision of scintillating screens which are provided with a variety of inorganic crystal phosphor elements embedded in the screen, and which is used to expose the x-ray film, or to illuminate a vidicon. The screens are operable to absorb the x-rays and to convert the x-rays to photons or visible light. A number of attempts have been made to render screens more sensitive to x-rays, such as providing screens in various thicknesses, providing screens which have various amounts of the phosphorous materials embedded therein and providing screens which have higher resolutions. All of these modifications require that, in order to produce a more intense image on the film or vidicon, the scintillating screens must be bombarded by large amounts of x-ray radiation which travel through the subject.

In all known scintillating screens, the x-rays which impinge on the screen contact the phosphor in or on the screen and produce visible light, which in turn causes light photons, along with the non-absorbed x-ray photons, to refract internally in the screen among the phosphorous particles, which causes a loss of optical imaging, resulting in a loss of resolution. Not all of the generated light exits the screen, as some of the light is dispersed while it travels laterally within the screen.

In the case of relatively thick screens, more x-ray photons are stopped and absorbed by the screen, which tends to create more visible light. However, thick screens are more likely to defuse light internally, resulting in lower resolution. Relative thin screens are less likely to defuse the light, but allow more of the x-ray photons to transit the screen unabsorbed. Thin screens therefore result in a higher resolution image, with less intensity, or brilliance, which requires a longer exposure. In some known systems, thin and thick screens are combined, with one screen on either side of the x-ray film, in order to produce an image which has a relatively short exposure time and results in an adequate image. However, the final resolution on the film ultimately requires sophisticated interpretation in order to discern the state of the subject which is depicted.

Another problem with scintillating screens which do not absorb the x-ray photons is transmission of the photons through the scintillating screen and beyond. While such problem is not particularly significant in the case of x-ray film, x-ray photons can have a detrimental effect on electronics, as may be present in camera systems.

An object of the invention is to provide an x-ray imaging system which has a very high resolution, absorbs nearly all of the x-ray photons impinging thereon, and produces a brilliant, visible-light image.

Another object of the invention is to provide an x-ray imaging system which is suitable for use with a camera system, to provide real-time x-ray images.

Another object of the invention is to provide an x-ray imaging system which utilizes a variable field of focus lens and charge-coupled device camera.

SUMMARY OF THE INVENTION

The x-ray imaging system of the invention includes an x-ray source for providing x-ray photons which are directed towards a subject and impinge on a scintillating screen. The scintillating screen converts the x-ray photons into a visible light image. The screen is formed of discreet, elongate fiber optic elements arranged side-by-side, having a mirrored surface at one end thereof. The elements are formed of a mixture of glass and rare earth elements which convert the x-ray photons into visible light by first phosphoring and then lasing. The system includes a camera system for capturing the visible light image for remote viewing. A method of constructing the scintillating screen of the invention is disclosed.

These and other objects and advantages of the invention will become more fully apparent as the description which follows is read in conjunction with the drawings.

BRIEF DESCRIPTION OF THE DRAWINGS

FIG. 2 is a greatly enlarged medial section of the scintillating screen of the invention.

FIG. 3 is a somewhat schematic, side elevation of the charge-coupled device of the camera system of the invention.

FIG. 4 is a cross section of the scintillating screen of the invention, taken along line 4—4 of FIG. 2.

DETAILED DESCRIPTION OF THE PREFERRED EMBODIMENT

Figure 1:
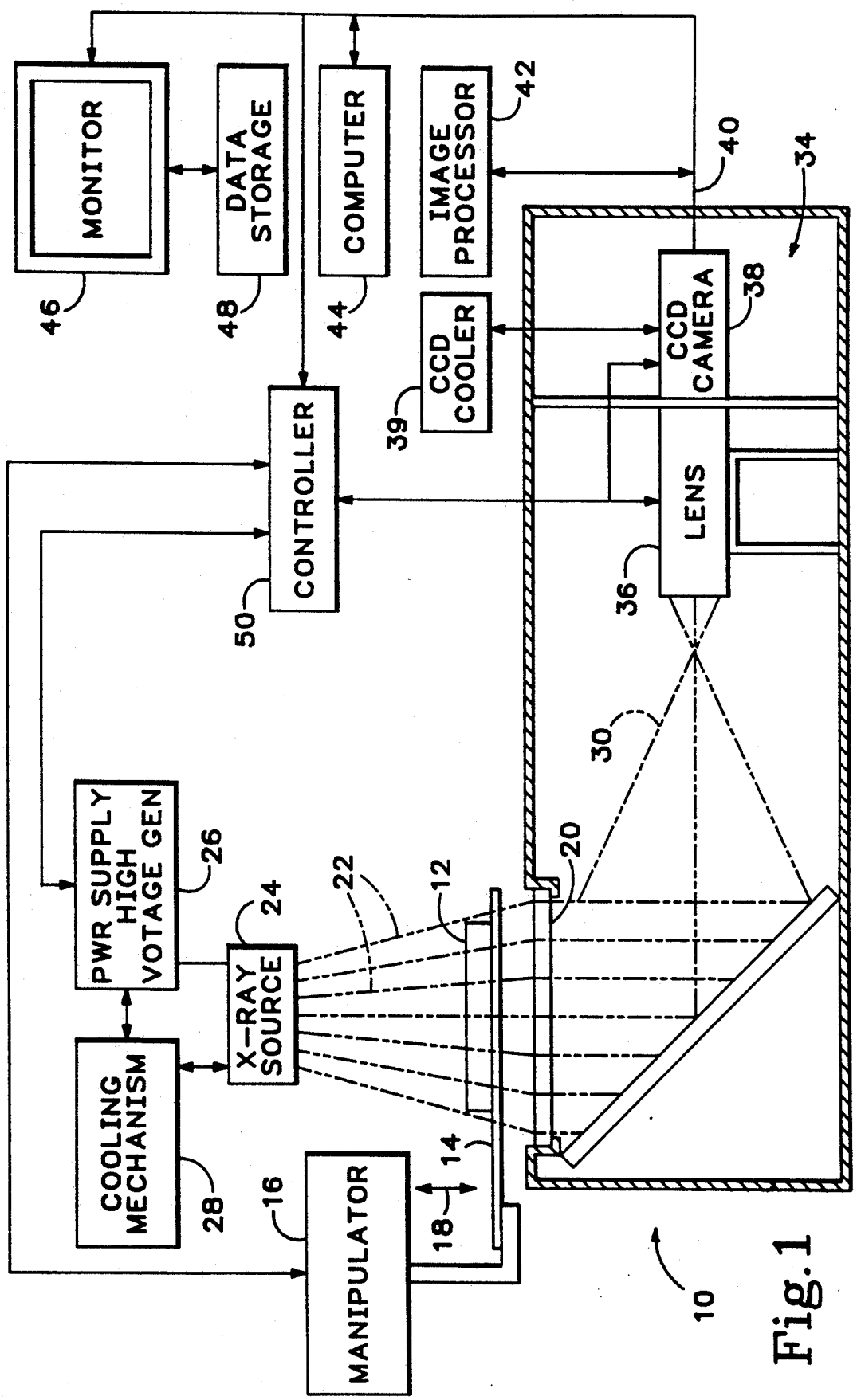
FIG. 1 is a schematic block-diagram of the real-time x-ray imaging system of the invention.

Referring now to the drawings, and initially to FIG. 1, a real-time x-ray imaging system constructed according to the invention is depicted generally at 10. System 10 is constructed to provide an x-ray image of a subject 12, which is carried on a suitable platform 14 of a subject manipulator 16. Manipulator 16 is operable to raise and lower platform 14 in the vertical, as depicted by arrow 18. Manipulator 16 may also be constructed to shift subject 12 in the horizontal, so that varying parts of the subject may be passed over a scintillating screen 20, which is operable to convert x-rays into visible light. X-rays, depicted by dashed lines 22, are generated by a x-ray source 24, which is connected to a power supply/high voltage generator 26, and a cooling mechanism 28. X-ray source 24 and its associated mechanisms are of conventional design.

X-rays 22 which strike screen 20 are converted into visible light rays, depicted by dashed dot lines 30, which are reflected off of a mirror 32 towards a camera system of the invention, depicted generally at 34. Camera system 34 includes a lens 36 and a charge-coupled device (CCD) camera 38, which is connected to a CCD cooler 39. CCD camera 38 generates electrical signals in response to light rays 30, which signals 40 are transmitted to an image processor 42, a computer 44, a monitor 46, having a data storage device 48 attached thereto, and to a controller 50, which is used to control operation of the imaging system.

A particular importance to the imaging system of the invention is scintillating screen 20. As previously noted, known scintillating screens used for the conversion of x-ray photons to visible light photons convert approximately 35–40 percent of the x-ray photons to visible light. The remaining x-ray photons are either absorbed, without generating visible light, or pass through the screen without producing any visible light. The scintillating screen of the invention is operable to convert nearly 100 percent of the x-ray photons which strike it to visible light. Specifically, calculations have determined that 99.75 percent of x-ray photons striking a scintillating screen constructed according to the invention are converted to visible light.

Turning now to FIG. 2, a very small portion of screen 20 is depicted a medical in cross-section. FIG. 4 depicts a portion of the screen in a top plan cross-section. It should be appreciated, as will become readily apparent, that FIG. 2 is not drawn to scale. Screen 20 consists of a large number of discrete, elongate fiber optic elements, such as elements 52, 54, 56 and 58, which have a hexagonal cross-section, as shown in FIG. 4. These elements are arranged side-by-side and have a mirrored surface 60 formed on one end thereof. The fiber optic elements used in screen 20 are formed of glass ($SiO_2$) which is formed with a number of rare earth elements. The rare earth elements are operable to convert x-ray photons 22 into visible light rays 30. This conversion is nearly 100 percent complete, and is accomplished by providing rare earth elements which will phosphor when struck by x-ray photons, and which are then operable to lase, resulting in a coherent light beam which passes out of any given fiber optic element.

A number of rare earth elements are mixed with glass (silicon dioxide $SiO_2$, Pirex ®) in order to provide a hyperthermal silica glass compound having the desired property. In the preferred embodiment, strontium (Sr), cesium (Cs), thallium (Tl), and terbium (Tb) are mixed with the $SiO_2$, in order to prepare the glass compound. The method of preparing the glass compound includes beginning with a $SiO_2$ base, and adding the rare earth elements as a percentage of total weight of the final compound at specific temperatures. Initially, a portion of $SiO_2$ is prepared, which forms 51% of the final glass compound. The $SiO_2$ compound actually contains about 5% inert material and actually comprises 56% of the final weight, however, the actual $SiO_2$ is only 51% of the total. Twenty percent (20%) by weight of distilled $SrO_2$ is added to the glass, as is 14% $CsO_2$ in the form of reduced pollucite, 5% of distilled $Tl_2O$ and 5% rare earth blended terbium, which is reduced to pure $Tb_2O$.

The individual rare earth elements brings specific properties to the final mix. Strontium converts low energy x-rays to light and also serves as a wetting and mirroring element for the glass. It produces a brilliance level of 2000, as measured by reflective light meter, at 6396 Å. Cesium functions as a x-ray absorber, resulting in a brilliance level of 290 at 5762 Å, and also acts as a lasing agent. Terbium is a coherent lasing material, particularly in the 5460 Å range, and results in a brilliance level of 2200 at 4318 Å. However, an excessive amount of terbium may absorb too many x-ray photons, reducing the amount of screen brilliance. Finally, thallium produces a brilliance level of 1800 at 5350 Å, and provides a high index of refraction in the final glass product, which helps to keep the visible light in an individual element. The combination of rare earth elements in the $SiO_2$ base result in a conversion of x-ray photons to light in excess of 99 percent.

After the glass composition is blended, the mixture is brought to a temperature of 3200° C. after which it is die formed into hexagonal cross-section tubes having sides of approximately 2.54 cm (1 in). Once the hexagonal tubes are formed, they are placed in a pulling tower in a heat field, with a temperature maintained at 3200° C. The hexagonal tube is pulled into a thin fiber having a hexagonal cross-section of between 0.012 mm–0.018 mm. The fibers are cut into lengths of approximately 15 cm (6 in) and stacked in a die to form a solid field of fibers which contact one another along their side, and which forms a square block of fibers, when viewed from their end, having a dimension of 15.25 cm × 12.5 cm (6 in × 6 in). The block is placed in a furnace which is heated to 3600° C., and hydraulic pressure is applied to the sides of the die, which pressure is approximately 13–17 $gm/cm^2$, resulting in a compression of approximately 15%, also referred to herein as an 85% packing. The block is left in a 3600° C. furnace for approximately 12 minutes, after which it is cooled. The cooling takes approximately two hours and results in a 15.25 cm × 15.25 cm (6 in × 6 in) block, which appears to be a solid piece of glass. After the compression and cooling, the cross-section diameter of the individual fiber optic elements is approximately 0.008 mm-0.012 mm. This results in a fiber optic element density of approximately $1.376 \times 10^6$ fibers/cm$^2$ ($9 \times 10^6$ fibers/in$^2$).

The block is then cut to a fraction of the speed of light index with a diamond saw, providing fiber optic cables of 3.175 mm in length, which is also the thickness of the block after cutting and polishing. This thickness provides a light transit time through the block of 1.016 picoseconds. Any shorter light transit time will result in cross referencing between fiber optic cables, which is the optical equivalent of electronic noise. The glass is polished by conventional polishing techniques to provide a ripple-free surface on both sides of the bundle.

A metal layer is deposited, using an epitaxial system, on one side of the fiber optic bundle, which results in a metal layer having a thickness of $2.54 \times 10^{-3}$ cm. The metal of choice, in the preferred embodiment is either aluminum or silver, which results in a mirrored surface, which will reflect visible light away from the scintillating screen upon the free side of the metal layer, and will reflect visible light back into the fiber optic bundle on the glass side of the metal layer. The metals selected are transparent to x-rays and do nothing to decrease the intensity of the x-rays passing therethrough.

The method of forming the glass used in the fiber optics of the screen provide encapsulation of rare earth elements, which stabilizes the rare earth elements and prevents decay of the rare earth elements. Decay of rare earth elements in conventional screen leads to a decrease in screen brilliance over time, which requires that the screen be replaced. The screen of the invention does not suffer from this shortcoming.

The screen of the invention, as previously noted, converts nearly 100% of the x-ray photons to visible light. X-ray procedures may therefore be performed using considerably less x-ray radiation to achieve a comparable level of visible-light illumination for reception by film or camera. The screen of the invention allows a reduction in patient x-ray dosage from 8 to 10 milliroentgen to less than 2 milliroentgen for normal breast or soft tissue x-rays. Most soft tissue x-rays do not require any more than 30 kilovolts at less than 8 milliamps at peak x-ray photon generation. The ability of the screen to amplify energy, which results in a more brilliant visible light output, reduces patient dosage considerably when compared to conventional systems.

In the event that a scintillating screen larger than about 15 cm × 15 cm is desired, a number of screen segments may be put together to form screens having virtually any dimension. While it is certainly possible to construct screens which are initially larger than 15 cm × 15 cm, the handling of such a large number of fiber optic elements may be unwieldy and there is always the possibility that a larger bundle pack may "erupt" as pressure is applied thereto.

Returning now to FIG. 2, an x-ray 22 is depicted impinging on screen 20 through mirrored surface 60. As the x-ray photons enter a fiber optic element, such as element 52, the x-ray photons strike the phosphoring elements, such as gallium, which converts the x-ray photons into visible light. Because of the density of the glass, and the precise length of the fiber optic element, an x-ray will remain within the confines of a single fiber optic element, and will bounce, or ricochet until it strikes a phosphoring element. This enables nearly 100 percent of the x-ray photons to be converted into light, as compared to the normal 35-40 percent conversion that takes place in conventional, known scintillating screens.

As the light is produced within the fiber optic element, it will also bounce or ricochet about in the tube, striking the mirrored sides and mirrored surface 60 of each individual element and will be intensified as the light results in lasing, which is the result of light striking the strontium and thallium particles in the glass. After the light has become intensified, and after a number of refractions within the fiber optic element, a coherent light ray 30 will be emitted from the non-mirrored end of a fiber optic element. In the system depicted in FIG. 1, such light will strike mirror 32 and be directed towards camera system 34.

In the preferred embodiment, mirror 32 is formed of a sheet of glass which is 2.54 cm (1 in) thick, having a reflective surface with a reflectivity of 90%-95%, in the visible range, with a center wavelength of 560 nm. The reflective surface, in the preferred embodiment, has a silver coating. Once the light is reflected off of mirror 32, it is directed towards lens 36.

Lens 36 is manufactured to specifications which require that the lens be of the variable field of view type, with automatic focusing such that the lens maintains the image in focus as its field of view changes. The lens, in the preferred embodiment, has a zoom ratio of 12:1, and an f 0.89 aperture. Although lenses having other characteristics may be used, a lens having the preferred characteristics has been determined to be particularly well suited for use in the system.

Turning now to FIG. 3, a portion of CCD camera 38 is depicted. CCD camera 38 includes a charge-coupled device 62, such as is manufactured by Tektronix, Inc. of Beaverton, Ore. under the product identification TK-512CF, by the Eastman Kodak Company of Rochester, N.Y. under the product designation KAF 1400, or by a Thompson chip TH7883-PM. CCD chip 62 is generally of the frame transfer type, having what is known as a ⅔ inch format, with a size of 6.6 mm × 8.8 mm. The chip has a vertical element resolution minimum of approximately 486 lines, with a sell size of $7.8\mu \times 13.6\mu$. There are 1134+24 dark cells per line, for a total of 1,130,208 cells in the chip.

CCD chip 62 is received in a chip mount 64 and is attached to a peltier cooling device 66 by a bonding agent 68, such as Cyanoacrylate. A radiator 70 is attached to cooling device 66 and includes an intake line 72 and an output line 74, which are connected to CCD cooler 39. CCD cooler 39 includes a pump mechanism, to circulate a coolant, such as ethylene glycol, through radiator 70 and CCD cooler 39 by means of line 72 and 74, and includes a radiator and cooling fan (not shown) in the portion of the CCD cooler portion which is usually located external to camera system 34. Output from CCD chip 62 goes into CCD output 76 which is connected to signal bus 40, and to the remaining components of the image processing system.

Output from CCD camera 38 is processed by image processor 42, which may include image processing software, such as that of Quantex Corporation, which provides conventional image processing for CCD chips.

The processed image is directed to monitor 46, and may be stored in a data storage unit 48. Further manipulation of the processed image may be accomplished by computer 44.

Thus, a very efficient and brilliance scintillating screen, and a method for manufacturing the screen has been disclosed, along with a description of a use of the screen in a real-time x-ray imaging system. Although a preferred embodiment of the apparatus and method have been disclosed herein, it should be appreciated that further variations and modification may be made thereto without departing from the scope of the invention as defined in the appended claims.

What is claimed is:

1. A real-time x-ray imaging system for taking an x-ray image of a subject comprising:

an x-ray source for providing x-ray photons;

a scintillating screen for converting said x-ray photons into a visible light image, said screen being formed of discrete elongate fiber optic elements arranged side-by-side and having a mirrored surface at one end thereof, said elements consisting of a mixture of glass and rare earth compounds which convert said x-ray photons into visible light, wherein said rare earth compounds include compounds of strontium, cesium, thallium and terbium; and a camera system for capturing said visible light image for remote viewing.

2. The real-time x-ray imaging system of claim 1 wherein said rare earth compounds are suspended in a silica ($SiO_2$) substrate by percentage of total weight as follows: $Sr_2O$-20%, $Cs_2O$-14%, $Tl_2O$-5% and $Tb_2O$-5%.

3. The real-time x-ray imaging system of claim 1 wherein said elements have a generally hexagonal cross section.

4. The real-time x-ray imaging system of claim 3 wherein said elements are formed with a cross-sectional width in the range of about 0.012 mm to 0.018 mm, and are subsequently compressed to a cross-sectional width of between about 0.008 mm to 0.012 mm.

5. The real-time x-ray imaging system of claim 4 wherein each element has a length of about 3.175 mm and a visible light transit time, from one end of said element to the other end of said element, of about 1.016 picoseconds.

6. The real-time x-ray imaging system of claim 1 wherein said mirrored surface has a metal coating taken from the group consisting of Al and Ag.

7. The real-time x-ray imaging system of claim 6 wherein said coating has a thickness in the range of between about 0.127 mm to 0.381 mm.

8. The real-time x-ray imaging system of claim 1 wherein said camera system includes a charge-coupled device (CCD) camera having a peltier cooling device convectionally attached to a CCD chip, and wherein said peltier device is externally cooled.

9. The real-time x-ray imaging system of claim 1 wherein said camera system includes a variable field of view, automatic focussing zoom lens having a zoom ratio of 12:1 and an aperture of f 0.89.

10. A real-time x-ray imaging system for taking an x-ray image of a subject comprising:

an x-ray source for providing x-ray photons;

a scintillating screen for converting said x-ray photons into a visible light image, said screen being formed of discrete elongate fiber optic elements arranged side-by-side and having a mirrored surface at one end thereof, said elements consisting of a mixture of glass and rare earth compounds which convert said x-ray photons into visible light, wherein said rare earth compounds are suspended in a silica ($SiO_2$) substrate by percentage of total weight as follows: $Sr_2O$-20%, $Cs_2O$-14%, $Tl_2O$-5% and $Tb_2O$-5%; and a camera system for capturing said visible light image for remote viewing.

11. The real-time x-ray imaging system of claim 10 wherein said elements have a generally hexagonal cross section, and wherein said elements are formed with a cross-sectional width in the range of about 0.012 mm to 0.018 mm, and are subsequently compressed to a cross-sectional width of between about 0.008 mm to 0.012 mm.

12. The real-time x-ray imaging system of claim 11 wherein each element has a length of about 3.175 mm and a visible light transit time, from one end of said element to the other end of said element, of about 1.016 picoseconds.

13. The real-time x-ray imaging system of claim 10 wherein said mirrored surface has a metal coating, taken from the group consisting of Al and Ag, said coating having a thickness in the range of between about 0.127 mm to 0.381 mm.

14. The real-time x-ray imaging system of claim 10 wherein said camera system includes a charge-coupled device (CCD) camera having a peltier cooling device convectionally attached to a CCD chip, and wherein said peltier device is externally cooled.

15. The real-time x-ray imaging system of claim 10 wherein said camera system includes a variable field of view, automatic, constant focus zoom lens having a zoom ration of at least 12:1 and an aperture of at least f 0.89.

* * * * *